(12) United States Patent
Takashima

(10) Patent No.: US 6,219,148 B1
(45) Date of Patent: *Apr. 17, 2001

(54) PRINTER SPOOLER OUTPUT APPARATUS AND METHOD WITH COMPUTER PROGRAM AND MEMORY STORAGE MEDIUM

(75) Inventor: Keiichi Takashima, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/812,287

(22) Filed: Mar. 6, 1997

(30) Foreign Application Priority Data

Mar. 8, 1996 (JP) .................................................. 8-079398
May 21, 1996 (JP) .................................................. 8-125481

(51) Int. Cl.[7] .................................................. G06F 15/00
(52) U.S. Cl. ...................... 358/1.15; 358/1.13; 358/1.14; 358/1.16
(58) Field of Search ..................................... 395/114, 113, 395/200, 112; 358/1.17, 403, 296, 401, 1.13–1.16; 710/36, 46, 106–107; 399/403, 82, 33; 709/207, 229, 100

(56) References Cited

U.S. PATENT DOCUMENTS

| | | | |
|---|---|---|---|
| 4,918,588 | * 4/1990 | Barrett et al. | 707/10 |
| 5,164,842 | * 11/1992 | Gauronski et al. | 358/401 |
| 5,303,336 | * 4/1994 | Kageyama et al. | 395/112 |
| 5,371,888 | * 12/1994 | Lehnertz et al. | 709/100 |
| 5,377,016 | * 12/1994 | Kashiwagi et al. | 358/403 |
| 5,444,782 | * 8/1995 | Adams, Jr. et al. | 713/153 |
| 5,463,772 | * 10/1995 | Thompson et al. | 707/101 |
| 5,490,237 | * 2/1996 | Zimmerman et al. | 358/1.16 |
| 5,528,346 | * 6/1996 | Kim et al. | 399/33 |
| 5,566,278 | * 10/1996 | Patel et al. | 395/114 |
| 5,617,518 | * 4/1997 | Kuwamoto et al. | 395/112 |
| 5,625,757 | * 4/1997 | Kageyama et al. | 395/113 |
| 5,657,461 | * 8/1997 | Harkins et al. | 345/333 |
| 5,689,642 | * 11/1997 | Harkins et al. | 709/207 |
| 5,689,708 | * 11/1997 | Regnier et al. | 709/229 |
| 5,699,494 | * 12/1997 | Cocbert et al. | 395/114 |
| 5,799,159 | * 8/1998 | Abe | 710/107 |

* cited by examiner

Primary Examiner—Leo Boudreau
Assistant Examiner—Ishrat Sherali
(74) Attorney, Agent, or Firm—Fitzpatrick, Cella, Harper & Scinto

(57) ABSTRACT

A spooling method for sequentially printing a plurality of documents in which a server spools print data supplied from another information processing system on the same network. To realize this method, an output control apparatus for receiving data of a job unit input from a data source and outputting from an output unit data of the job unit in accordance with a predetermined order, includes a setting unit for setting an order of outputting data and a control unit for outputting from the output unit data of the job unit received from the data source, in accordance with the output order set by the setting unit.

38 Claims, 20 Drawing Sheets

FIG. 13
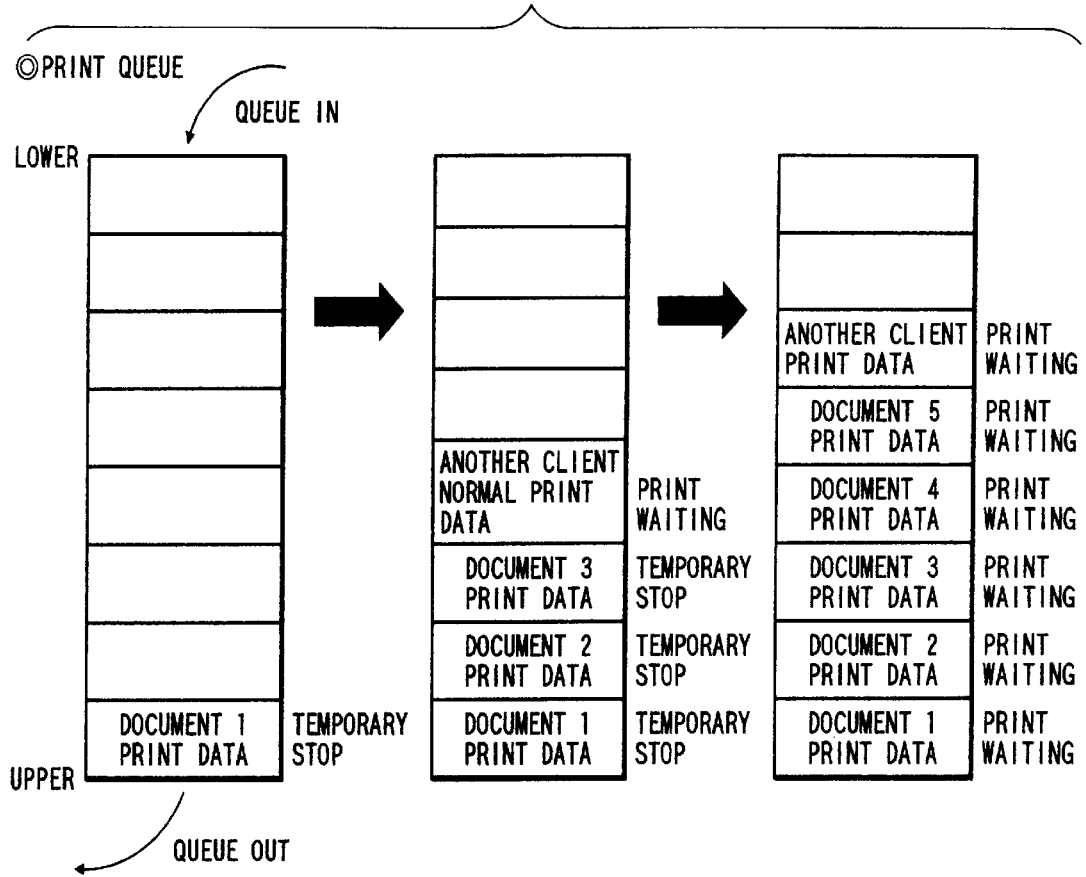
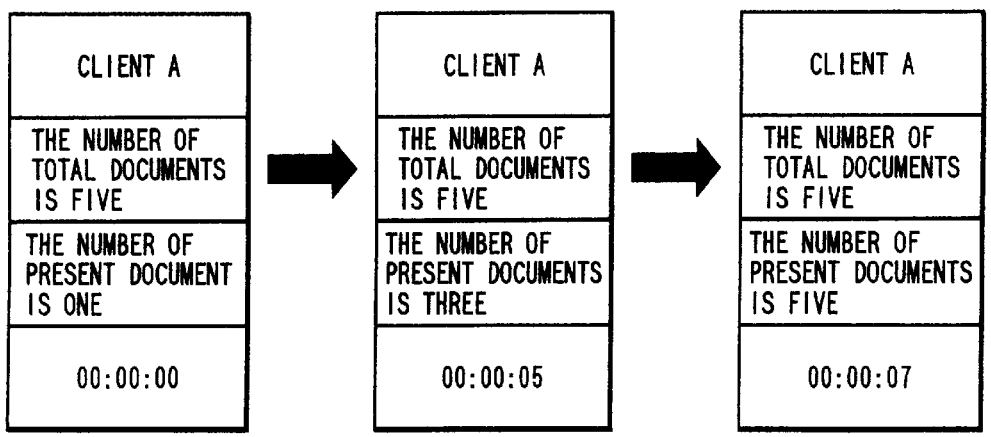

FIG. 17

Canon printer XYZ

PRINTER(P)  DOCUMENT(D)  DISPLAY(V)  HELP(H)

| DOCUMENT NAME | STATUS | OWNER | PROGRESS SITUATION | START TIME |
|---|---|---|---|---|
| FormCraft Pro-FORM1.FCP | IN SEQUENTIAL PRINTING | take | 11 BYTES/43.6KB | 20:15:26 97/02/12 (WEDNESDAY) |
| FormCraft Pro-FORM2.FCP | SEQUENTIAL PRINT STANDBY | take | 30.1KB | 20:17:54 97/02/12 (WEDNESDAY) |
| WordProcessor-FRIREKI.DOC | PRINT STANDBY | miyata | 18.7KB | 20:24:32 97/02/12 (WEDNESDAY) |

THE NUMBER OF PRINT WAITING JOBS: 3

PRINTER SPOOLER OUTPUT APPARATUS AND METHOD WITH COMPUTER PROGRAM AND MEMORY STORAGE MEDIUM

BACKGROUND OF THE INVENTION

1. Field of the Invention

The present invention relates to a spooling method for sequentially printing a plurality of documents in which a server spools print data supplied from another information processing system (hereinafter called a "client") on the same network.

2. Related Background Art

A spooler of a server spools print data to a printer by entering the print data from clients in a queue in the order of reception and outputting the print data in this order to the printer.

A plurality of documents to be printed are supplied to a server as one job of print data of these documents. Therefore, with a conventional spooling method, it happens that while a client continuously sends print data, print data from another client is mixed and enters in the queue of a spooler. In this case, a printer outputs mixed documents from a plurality of clients so that a user is required to manually separate the documents for each client. If the printer is locked so as to be occupied by only one client and not to receive a print request from other clients, sequential print by one client is possible but other clients cannot print out.

SUMMARY OF THE INVENTION

The invention has been made in consideration of the above circumstances. It is an object of the present invention to provide a spooling method for sequentially outputting print data supplied from an information processing system to a printer, which system issued a sequential print declaration.

In order to achieve the above object, an output control apparatus of this invention is structured in the following manner.

The output control apparatus for receiving data of each job unit input from a data source and outputting from an output unit output data of the job unit in accordance with a predetermined order, has setting means for setting an order of outputting data and control means for outputting from the output unit the output data of the job unit on the basis of the input data received from the data source, in accordance with the output order set by the setting means.

Other objects and features of this invention will become apparent from the following detailed description of the embodiments when read in conjunction with the accompanying drawings.

BRIEF DESCRIPTION OF THE DRAWINGS

FIG. 13 is a diagram illustrating a time sequence of a print queue of the spooler to which a spooling method for sequentially printing a plurality of documents is applied, according to the third and fourth embodiments of the invention.

FIG. 17 shows an example of a print order managed by the print server and displayed on a display of a host computer.

DETAILED DESCRIPTION OF THE PREFERRED EMBODIMENTS

<First Embodiment>

Figure 1:
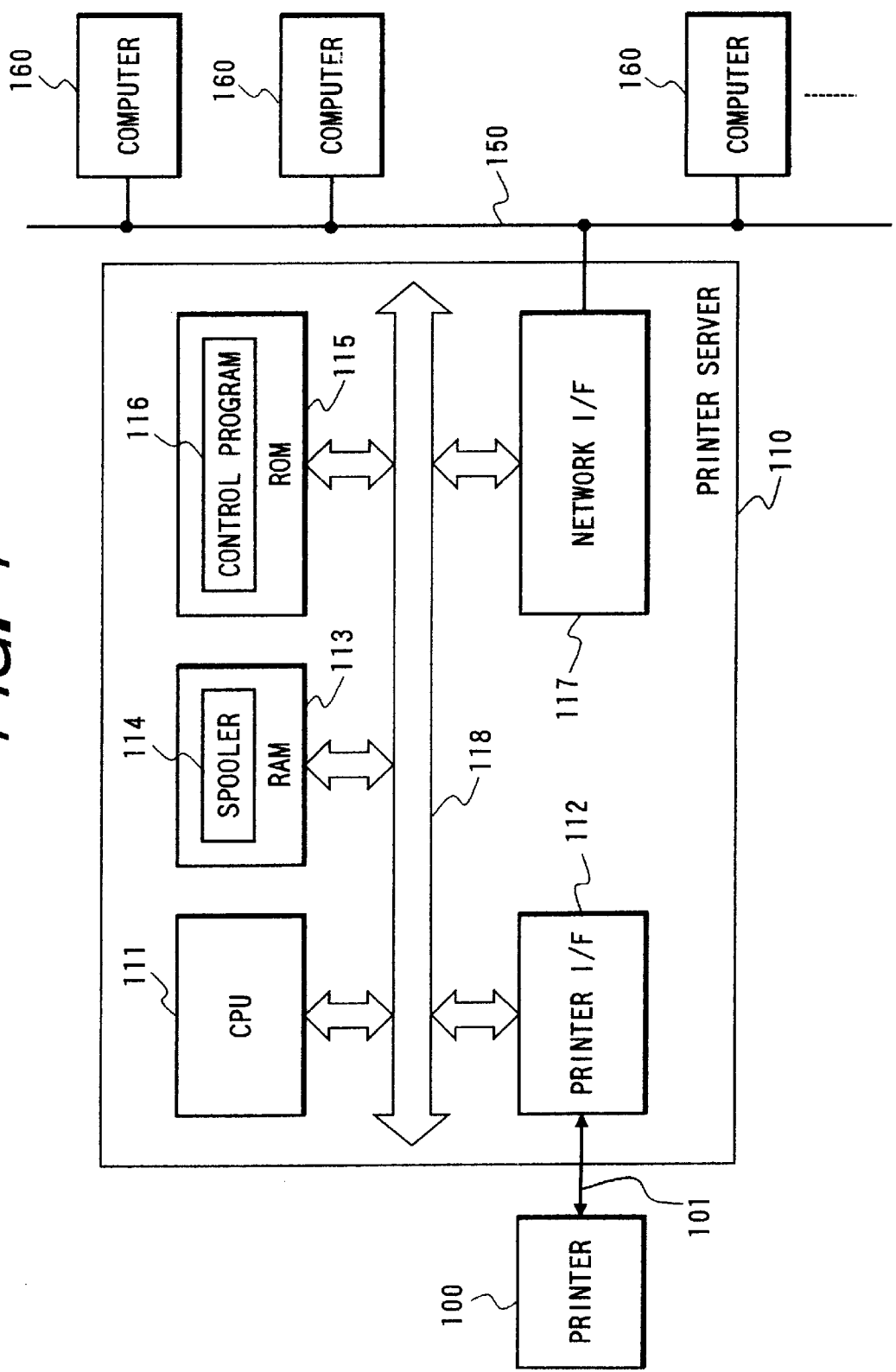
FIG. 1 is a block diagram showing an example of the structure of a printing system of this invention.

FIG. 1 is a block diagram showing an example of the structure of a printer system according to the first embodiment. A plurality of computers 160 and a printer server 110 are connected to a network cable 150. Each computer 160 can supply print data via the printer server 110 to a printer 100.

The printer server 110 is controlled by a CPU 111 which runs in accordance with a control program 116 stored in a ROM 115. Print data received from the computer 160 via a network interface (I/F) 117 is sequentially registered in a queue of a spooler 114 reserved in a RAM 113, and thereafter transmitted via a printer interface (I/F) 112 to the printer 100.

Figure 2:
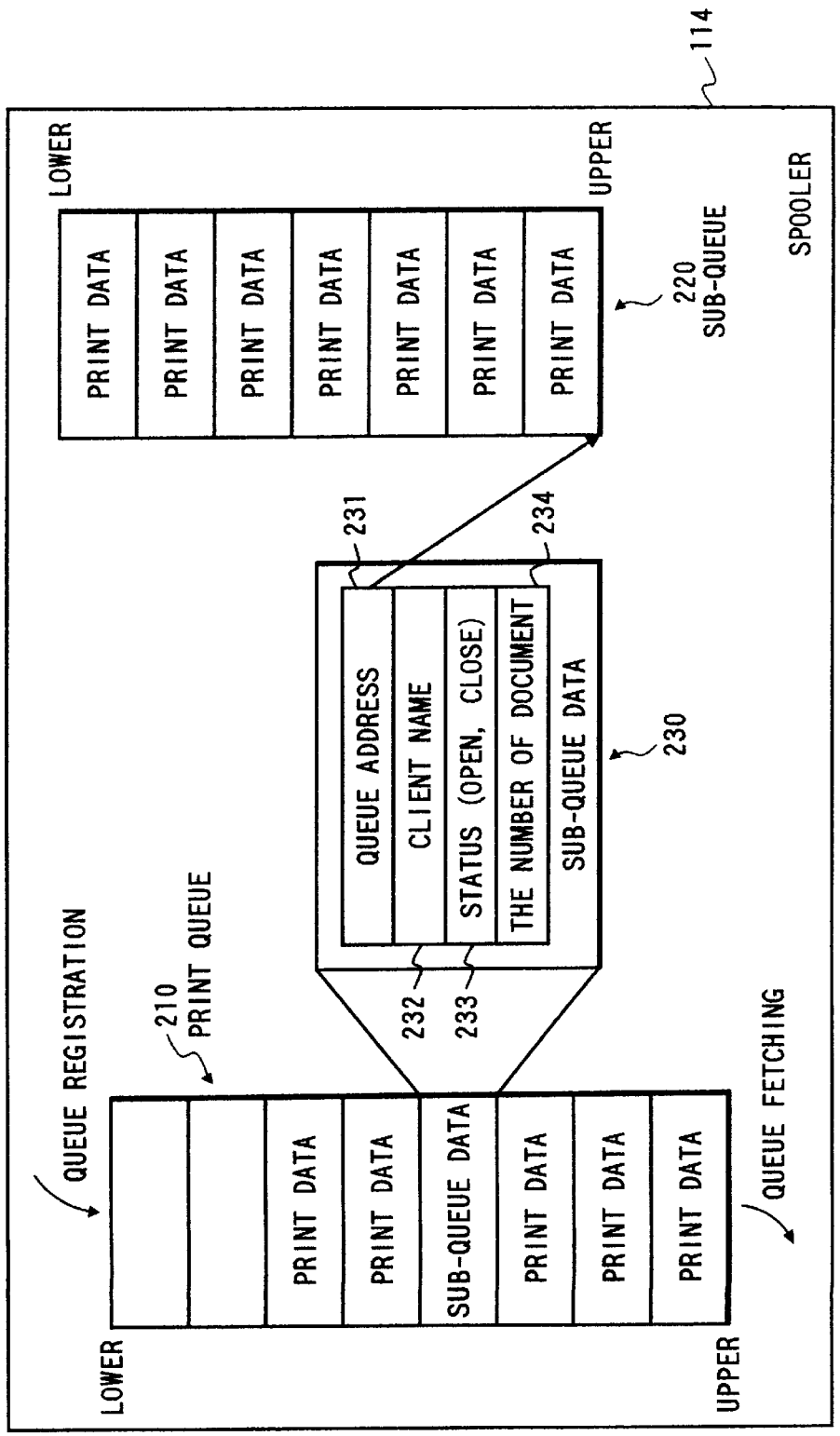
FIG. 2 is a conceptual diagram showing an example of the structure of a spooler.

FIG. 2 is a conceptual diagram showing an example of the structure of the spooler 114. In the following description, an operation of transmitting print data to the printer 100 in the order of print data reception is called an ordinary print mode, and an operation of sequentially transmitting a plurality of print data sets received from one computer 160 to the printer 100 irrespective of a presence/absence of data reception from another computer 160 is called a sequential print mode.

In the ordinary print mode, print data received from a plurality of computers 160 is registered in a print queue 210 in the order of print data reception. In the sequential print mode, a sub-queue 220 is formed, print data received from the computer 160 which instructed the sequential print is sequentially registered in the sub-queue 220, and sub-queue data 230 for managing the sub-queue 220 is registered in the print queue 210.

Print data 210 registered in the print queue 210 or print data registered in the sub-queue 220 identified by the sub-queue data 230 is transmitted from the upper side (exit) of the print queue 210.

Figure 3:
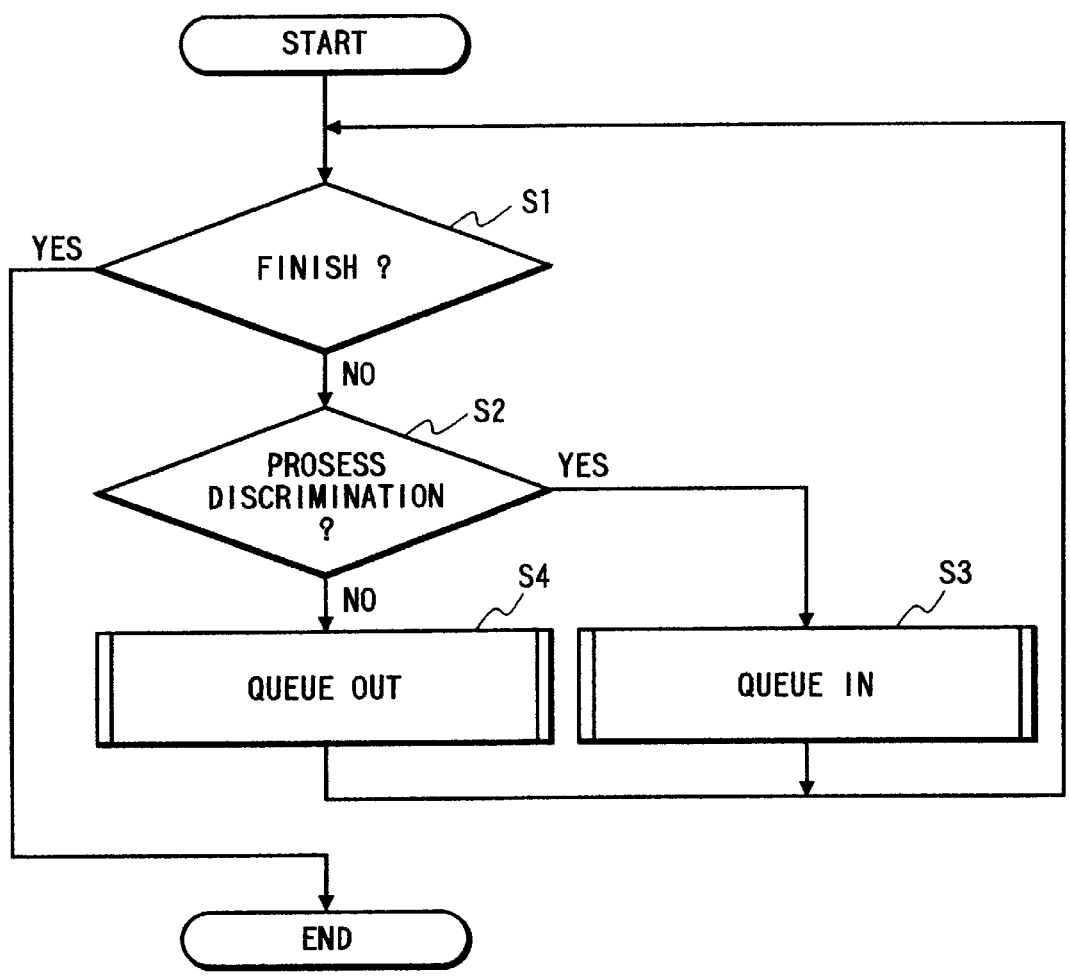
FIG. 3 is a flow chart illustrating a general operation of a spooler to which a spooling method of this invention for sequentially printing a plurality of documents is applied.
Figure 4:
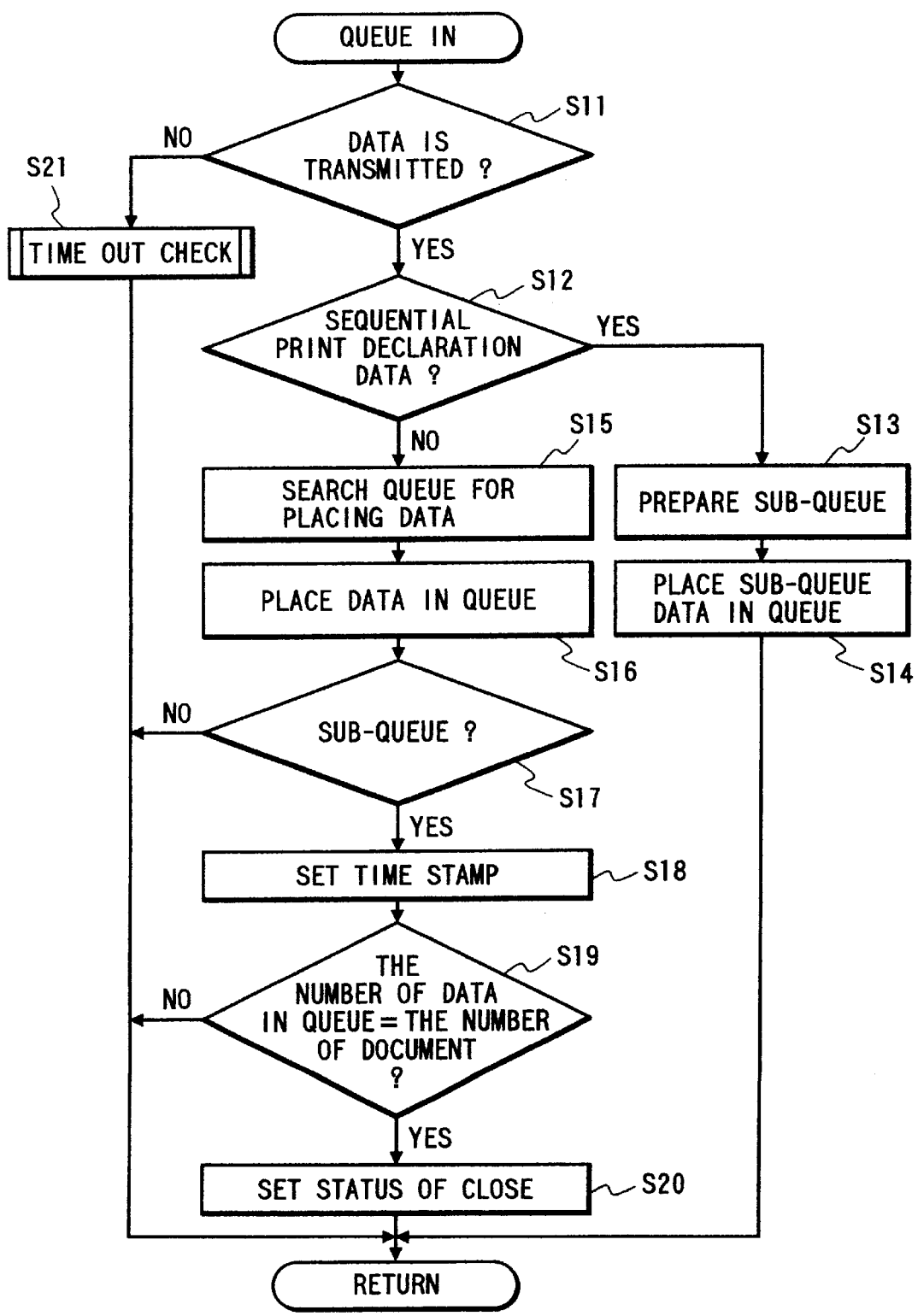
FIG. 4 is a flow chart illustrating a queue-in operation of a spooler to which a spooling method for sequentially printing a plurality of documents is applied, according to a first embodiment of the invention.
Figure 5:
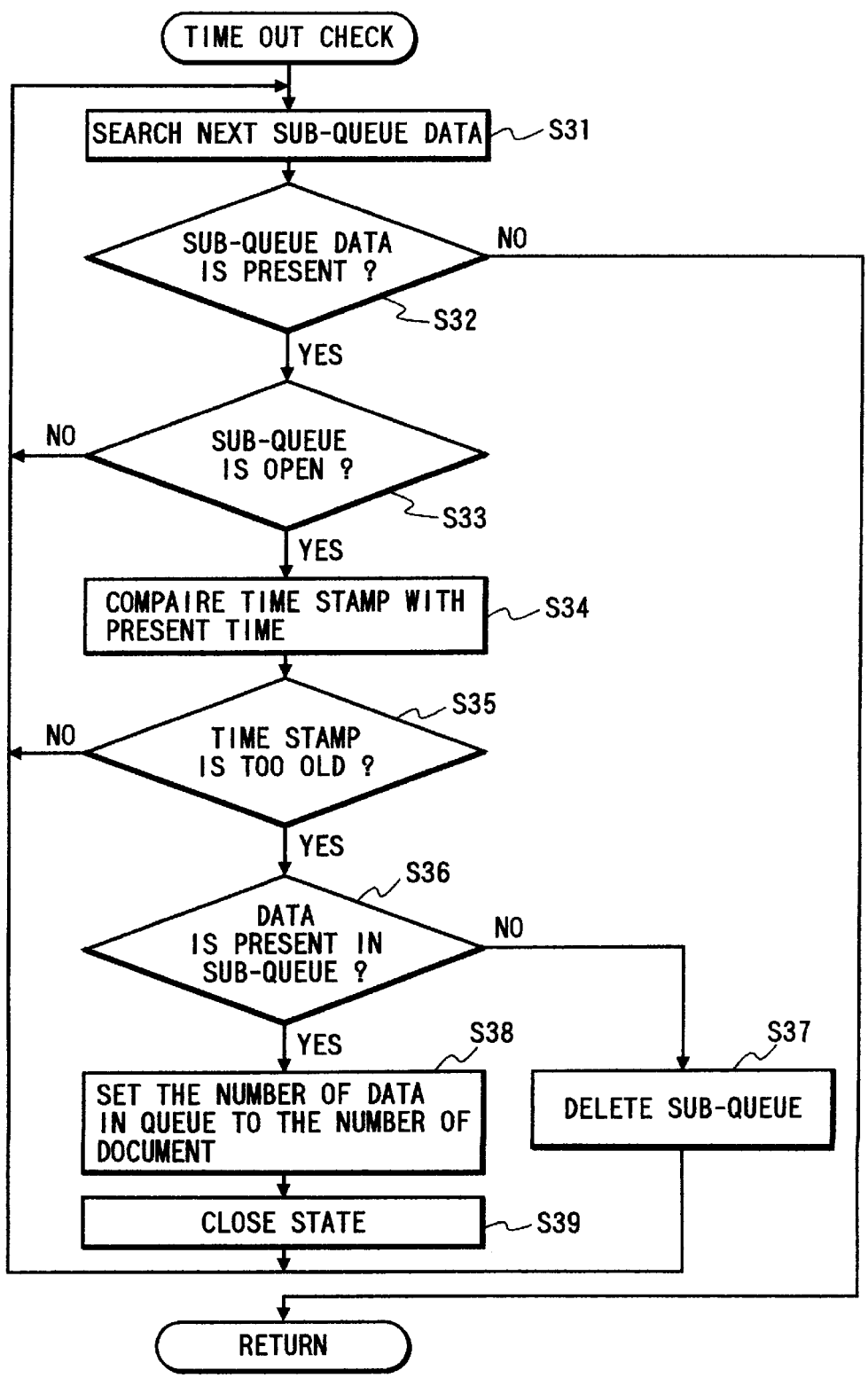
FIG. 5 is a flow chart illustrating a time-out check operation in the queue-in operation of a spooler to which a spooling method for sequentially printing a plurality of documents is applied, according to the first and second embodiments of the invention.
Figure 6:
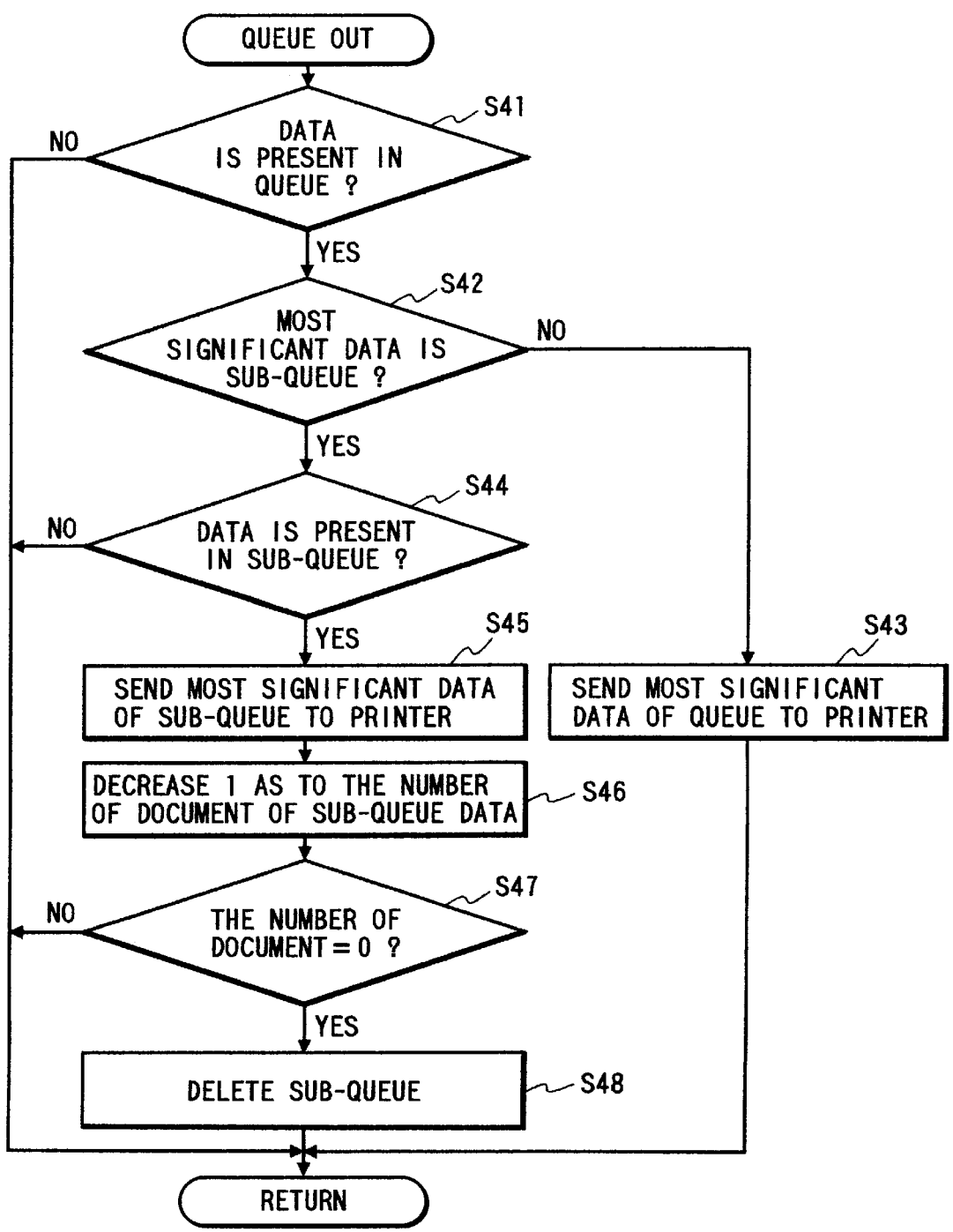
FIG. 6 is a flow chart illustrating a queue-out operation of the spooler to which a spooling method for sequentially printing a plurality of documents is applied, according to the first and second embodiments of the invention.

FIG. 3 is a flow chart illustrating a general operation of the spooler 114 to which a spooling method of the invention for sequentially printing a plurality of documents is applied. FIG. 4 is a flow chart illustrating a queue-in operation of the spooler 114 to which a spooling method for sequentially printing a plurality of documents is applied, according to the first embodiment of the invention. FIG. 5 is a flow chart illustrating a time-out check operation in the queue-in operation of the spooler 114 to which a spooling method for sequentially printing a plurality of documents is applied, according to the first and second embodiments of the invention. FIG. 6 is a flow chart illustrating a queue-out operation of the spooler 114 to which a spooling method for sequentially printing a plurality of documents is applied, according to the first and second embodiments of the invention.

As shown in FIG. 3, the print spooler operates under the control of CPU 111 in the following manner.

First, it is judged whether a user or a system has issued a finish command (Step S1). If not, data sent from a host computer (hereinafter called a client) 160 connected to the same network is stored in the print queue 210 of the spooler 114 (queue-in) (Step S3) or data is transmitted from the print queue 210 to the printer 100 (queue-out) (Step S4), depending upon a process discrimination by a predetermined scheduling method (Step S2). Print data is output from the print queue 210 in the order of print data reception (print data first registered (most significant) is output first).

As shown in FIG. 4, the queue-in process is executed under the control of CPU 111 in the following manner.

It is first checked whether data has been transmitted from a client (Step S11). If transmitted, it is checked whether the data is sequential print declaration data (Step S12). The sequential print declaration data is constituted of a client name and the number of documents to be sequentially printed. If the transmitted data is the sequential print declaration data, a sub-queue 220 is prepared (Step S13).

Figure 7:
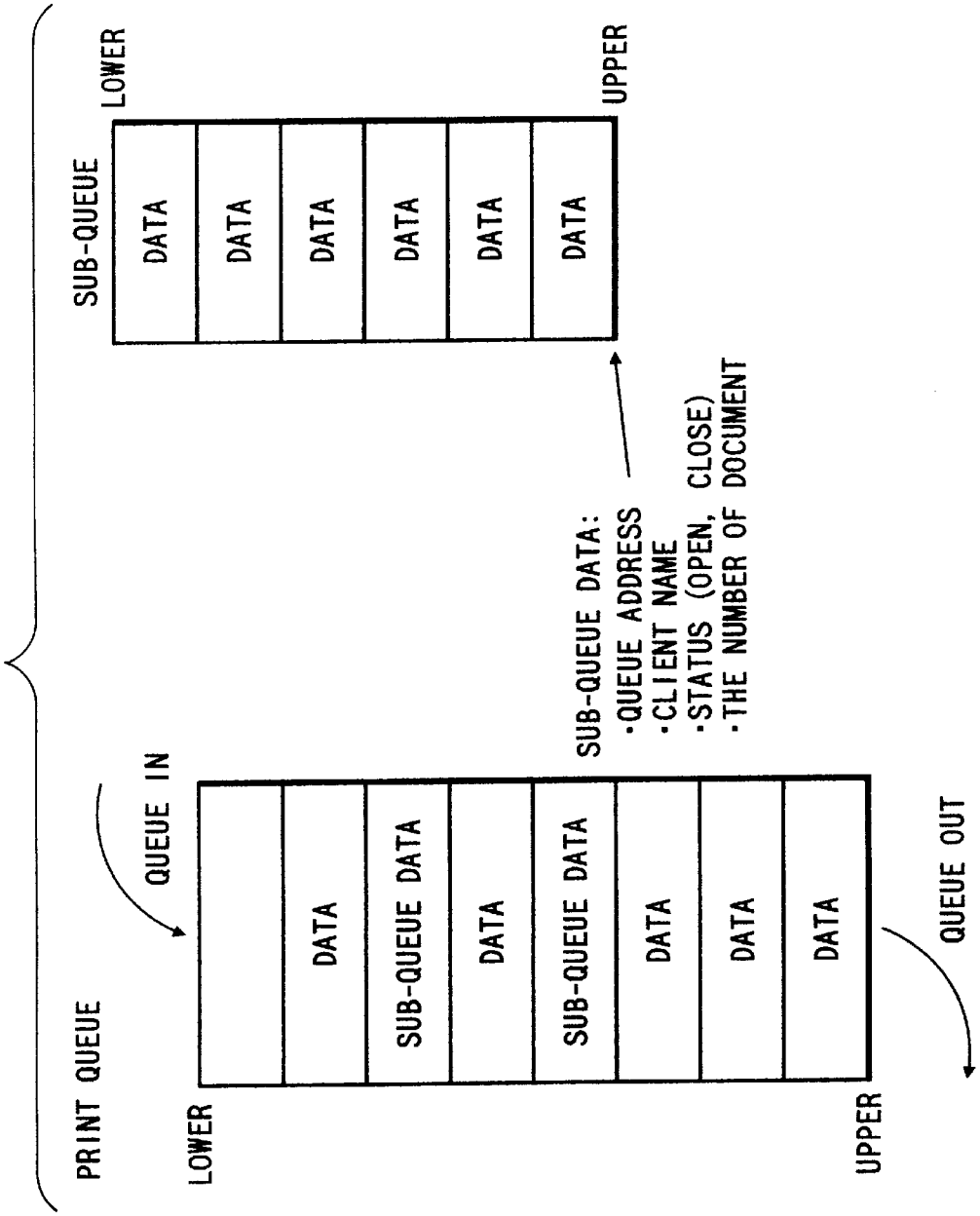
FIG. 7 is a diagram illustrating a print queue and a sub-queue of the spooler to which a spooling method for sequentially printing a plurality of documents is applied, according to the first embodiment of the invention.

Sub-queue data is placed in the sub-queue 220 (Step S14). The sub-queue data 230 is constituted of attributes including the address of the sub-queue, the client name, a status, the number of documents, and a time stamp. The sub-queue address is selected from the area of the spooler 114 which stores print data. The values of the sequential print declaration data are set as the client name and the number of documents. A current time is set as the time stamp. Either "open" or "close" is set as the status, in this case, "open" is set. As will be later described, this status is set to "close" after print data is transmitted from the client and stored in the sub-queue as many as the number of documents written in the sequential declaration data (refer to FIG. 7).

If it is judged as the ordinary print data at the judgement Step S12, the queue for placing the print data is searched (Step S15). If the print queue has the sub-queue data having the same client name as the print data sender and the status "open", the sub-queue at the sub-queue address in the sub-queue data becomes the queue in which the print data is registered. If there is no such sub-queue data, the print queue itself becomes the queue in which the print data is registered. After the queue is determined, the print data is registered in this queue (Step S16). The queue in which the data was registered is checked (Step S17). If this queue is not the sub-queue, the queue-in process is terminated. If this queue is the sub-queue, a current time is set as the time stamp of the sub-queue data (Step S18). The number of data sets in the sub-queue is compared with the number of documents set in the sub-queue data (Step S19). If the numbers are the same, the status is set to "close" so as not to register further print data in the sub-queue (Step S20), whereas if the numbers are different, the status setting is not changed and the queue-in process is terminated.

If it is judged at Step S11 that there is no data transmitted from a client, the time-out of all sub-queues is checked (Step S21). This process is executed so as to deal with the following case. Namely, if all the sequential print data sets do not reach the print server 110 after the client transmitted to the sequential print declaration data, the print server 110 waits for the remaining print data sets even it takes a fairly long time.

As shown in FIG. 5, the time-out check process is executed under the control of CPU 111 in the following manner.

The first sub-queue data is searched from the print queue (Step S31). It is judged whether there is sub-queue data (Step S32). If not, the time-out check process is terminated. If there is sub-queue data, it is checked whether the status in the sub-queue data is "close" or "open" (Step S33). If "close", it means that all the sequential print data sets have been registered. Therefore, the process returns to Step S31 to search the next sub-queue data. If "open", the time stamp in the sub-queue data is compared with a current time (Step S34) to judge whether the time stamp is too old (Step S35). If a difference between the time stamp and the current time is larger than a predetermined time, it is judged that the time stamp is too old. If it is judged that the time stamp is not old, the process returns to Step S31 to search the next sub-queue data.

If it is judged that the time stamp is too old, there is a possibility that data transmission from the client is intercepted by some reasons. Therefore, without waiting for further sequential print data at the print server 110, a preliminary process is executed for allowing the already received print data to be sequentially printed.

To this end, it is judged whether there is any print data in the sub-queue (Step S36). If not, the sub-queue and sub-queue data are deleted (Step S37) and the process returns to Step S31 to search the next sub-queue data. If there is print data in the sub-queue, the number of data sets in the sub-queue is set to the number of documents in the sub-queue data (Step S38), and the status of the sub-queue is set to "close" (Step S39) to return to Step S31 and search the next sub-queue.

After the time-out check process is executed for all sub-queues, this process is terminated.

As shown in FIG. 6, the queue-out process is executed under the control of CPU 111 in the following manner.

It is first checked whether data is present in the print queue (Step S41). If not, the queue-out process is terminated. If present, it is checked whether the most significant data is sub-queue data (Step S42). If the most significant data is print data, it is sent to the printer 100 (Step S43) and the queue-out process is terminated. If the most significant data is sub-queue data, it is checked whether data is present in the sub-queue (Step S44). If not, the queue-out process is terminated. If present, the most significant data in the sub-queue is sent to the printer 100 (Step S45) and the number of documents in the sub-queue data is decremented by 1 (Step S46). It is checked whether the number of documents is 0 (Step S47). If 0, the sub-queue and sub-queue data are deleted (Step S48), whereas if not 0, the queue-out process is terminated.

Figure 8:
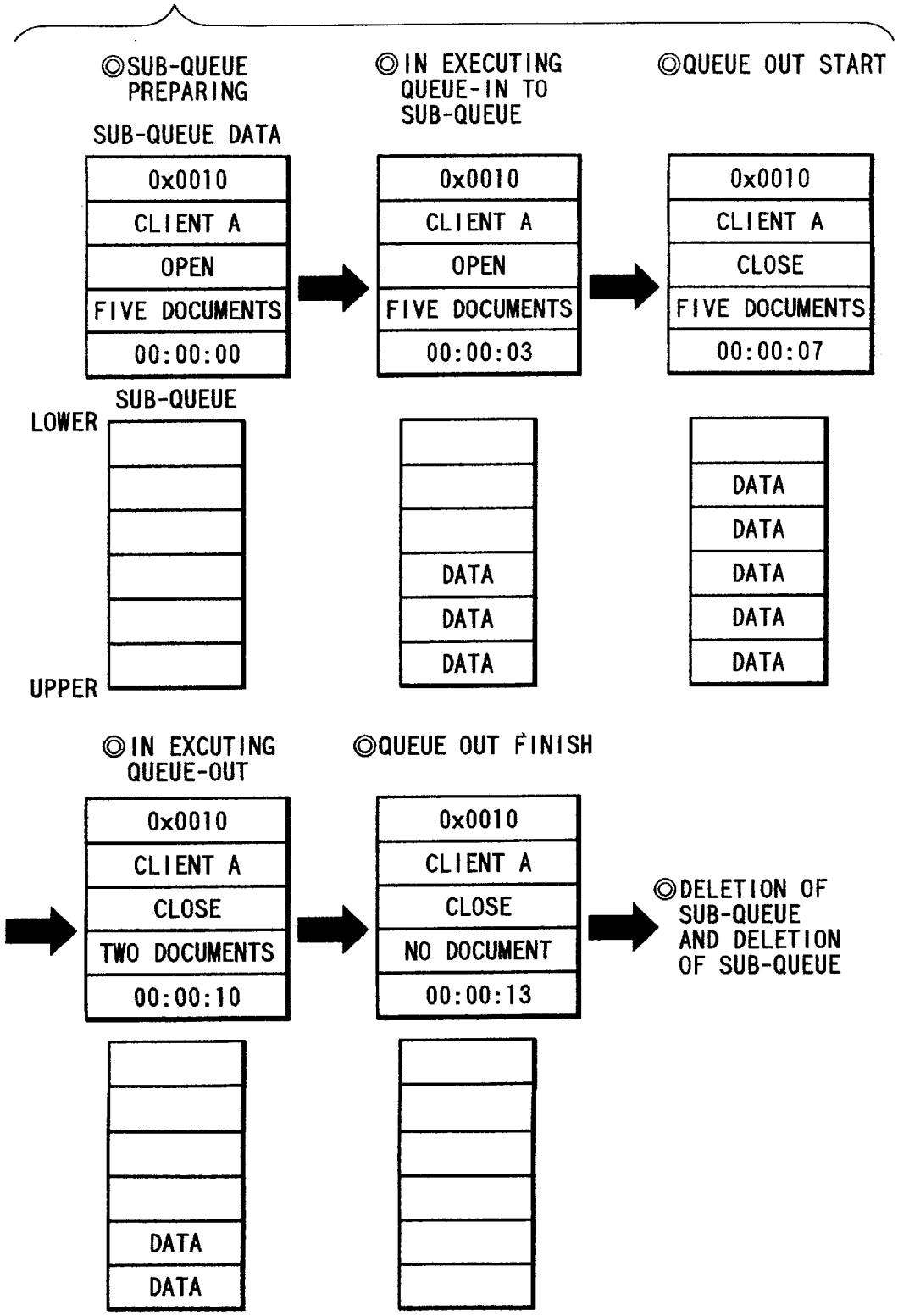
FIG. 8 is a status transition diagram of sub-queue data and a sub-queue of the spooler to which a spooling method for sequentially printing a plurality of documents is applied, according to the first and second embodiments of the invention.

The sub-queue data and the status of the sub-queue change during the queue-in and queue-out processes, as shown in FIG. 8.

If a plurality of clients perform sequential printing at the same time, there are a plurality of sub-queues.

<Second Embodiment>

Figure 9:
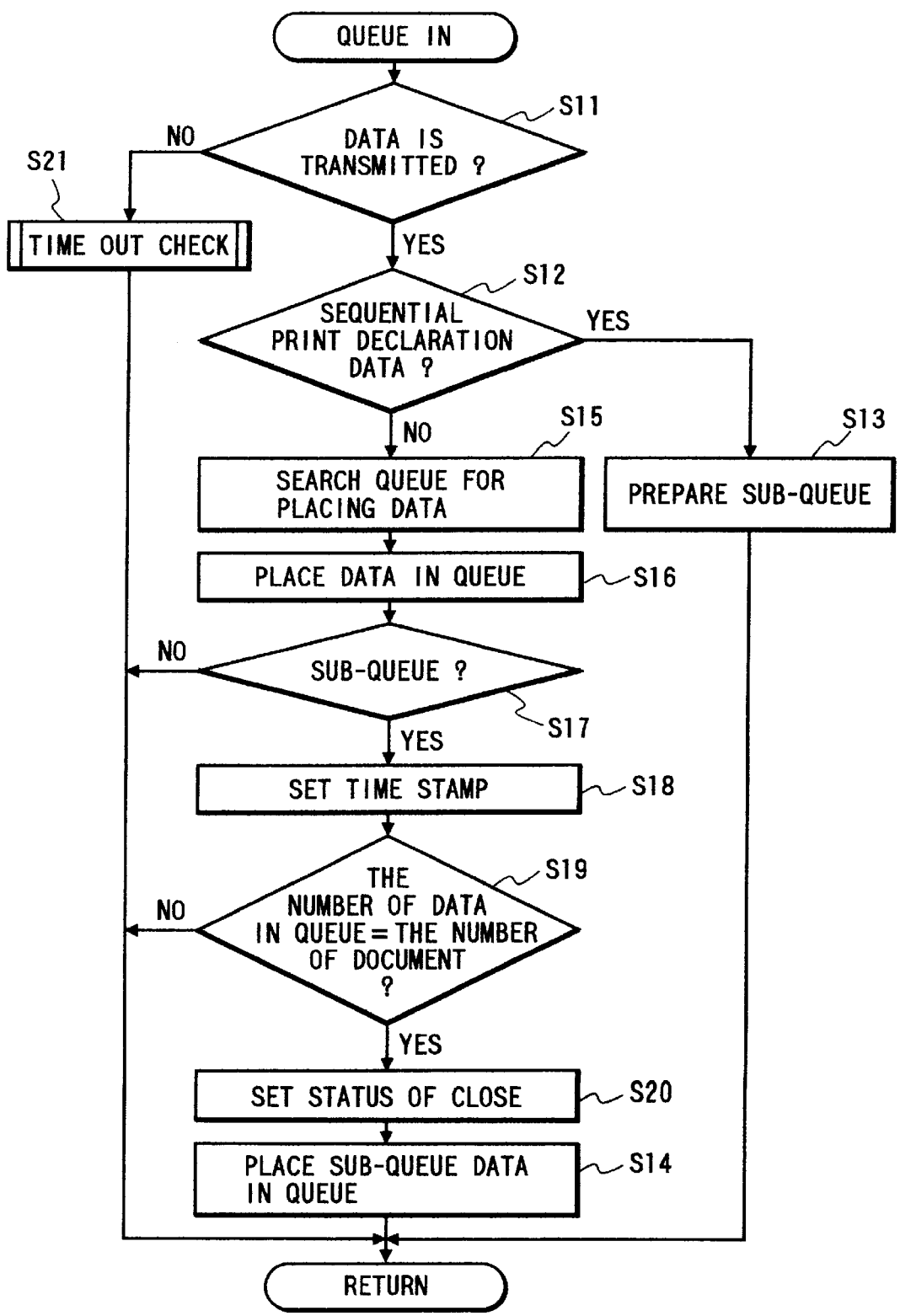
FIG. 9 is a flow chart illustrating a queue-in operation of the spooler to which a spooling method for sequentially printing a plurality of documents is applied, according to the second embodiment of the invention.

In the first embodiment, when the sequential print declaration data reaches the printer server 110, the sub-queue data is registered in the print queue, and print data from another client is suspended until all the sequential print data sets are sent to the printer 100. In the second embodiment, the sub-queue data is registered in the print queue when all the sequential print data sets reach, as shown in the flow chart of FIG. 9 (Step S14). In this case, CPU 111 operates not to make sequential print data from a client have a priority over the data from another client.

<Third Embodiment>

In the first and second embodiments, sequential printing is realized by forming a sub-queue and registering sequential print data in it during the queue-in process. Therefore, the queue-out process is required to match the queue-in process so that this queue-out process is different from a conventional system. In the third embodiment, only the queue-in process is made different and the queue-out process is the same as the conventional system.

Figure 10:
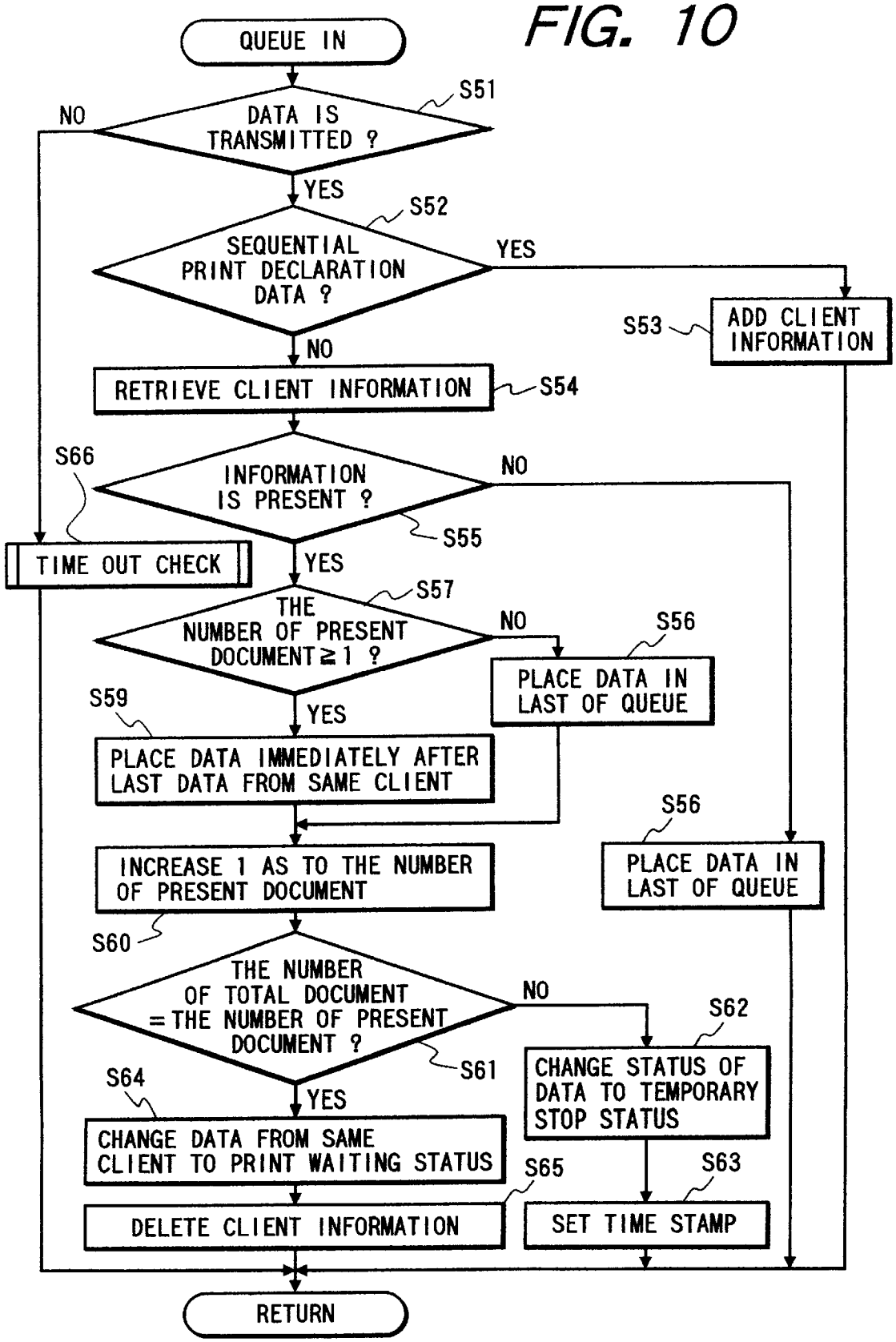
FIG. 10 is a flow chart illustrating a queue-in operation of the spooler to which a spooling method for sequentially printing a plurality of documents is applied, according to the third embodiment of the invention.
Figure 11:
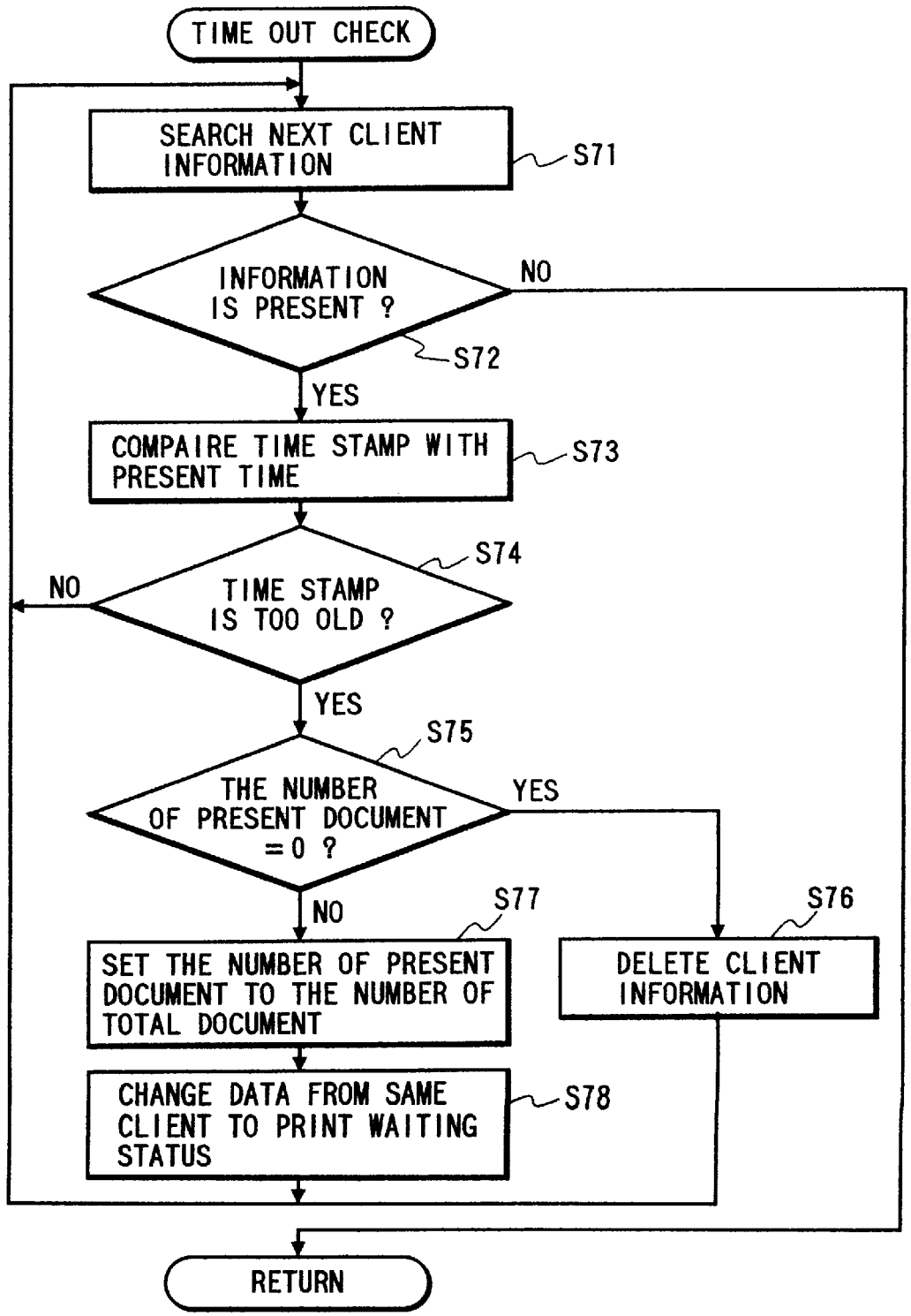
FIG. 11 is a flow chart illustrating a time-out check operation in the queue-in operation of the spooler to which a spooling method for sequentially printing a plurality of documents is applied, according to the third embodiment of the invention.
Figure 12:
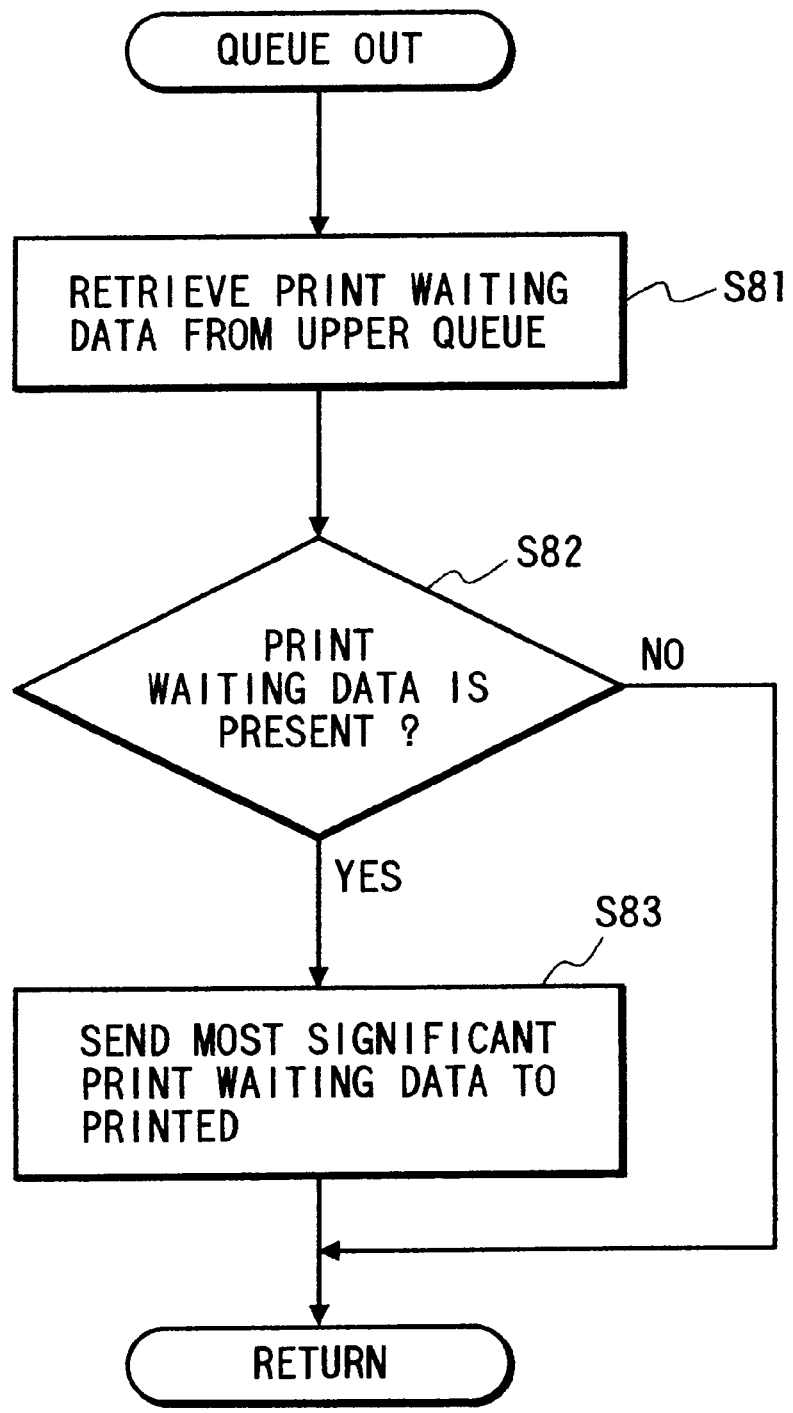
FIG. 12 is a flow chart illustrating a queue-out operation of a spooler to which a spooling method for sequentially printing a plurality of documents is applied, according to the third and fourth embodiments of the invention.

FIG. 10 is a flow chart illustrating a queue-in operation of the spooler 114 to which a spooling method for sequentially printing a plurality of documents is applied, according to the third embodiment of the invention. FIG. 11 is a flow chart illustrating a time-out check operation in the queue-in operation of the spooler 114 to which a spooling method for sequentially printing a plurality of documents is applied, according to the third embodiment of the invention. FIG. 12 is a flow chart illustrating a queue-out operation of the spooler 114 to which a spooling method for sequentially printing a plurality of documents is applied, according to the third and fourth embodiments of the invention.

As shown in FIG. 10, the queue-in process is executed under the control of CPU 111 in the following manner.

It is first checked whether data has been transmitted from a client (Step S51). If transmitted, it is checked whether the data is sequential print declaration data (Step S52). If the transmitted data is the sequential print declaration data, client information is additionally stored in the spooler 114 (Step S53) to terminate the queue-in process, the client information being a combination of a client name, the total number of documents, the present number of documents, and a time stamp. In this case, the present number of documents is 0 and the time stamp is a current time. If it is judged as the ordinary print data at the judgement Step S52, the client information of the same client transmitted the ordinary print data is searched from the spooler 114 (step S54). It is checked if the client information is present (Step S55). If not, the data is registered in the queue at the lowest (entrance) thereof (Step S56). If the client information is present, it is checked whether the present number of documents is 0 (Step S57). If 0, the data is registered in the queue at the lowest thereof (Step S58). If the present number of documents is 1 or larger, the lowest print data of the same client is searched from the queue, the data is inserted between the searched data and the next lower data, or placed at the lowest of the queue if the next lower data is not present (Step S59), and the present number of documents in the client information is incremented by 1 (Step S60). The total number of documents is compared with the present number of documents (Step S61). If the numbers are not the same, the data registered in the queue is made in a temporary suspension state (Step S62), and a current time is set to the time stamp in the client information (Step S63). If both the numbers are the same, all the data sets of the same client registered in the queue in the temporary suspension state are changed in a print wait state (Step S64), and the client information of the client stored in the spooler 114 is deleted (Step S65).

The operation of the spooler 114 of the printer server 110 will be described by taking as an example sequentially printing five documents transmitted from a client "A" (refer to FIG. 13). The client "A" transmits to the printer server 110 six data sets including sequential print declaration data, document 1 print data, document 2 print data, . . . , document 5 print data, in this order. The sequential print declaration data is constituted of the client name and the total number of documents to be sequentially printed.

When the sequential print declaration data is received at time 00:00:00, the client information is stored in the spooler 114, the client information being "client name: A, total document number: 5, present document number: 0, time stamp: 00:00:00". Next, when the document 1 print data is received, this data is judged as print data. The client information searched from the spooler 114 indicates "client name: A, total document number: 5, present document number: 0, time stamp: 00:00:00". Therefore, the document 1 print data is placed in the queue at the lowest, the present number of documents is set to 1, the document 1 print data is made in the temporary suspension state, and a current time is set to the time stamp. Next, when the document 2 print data is received, this data is placed immediately after the document 1 print data, i.e., at the lowest of the queue, the present number of documents is incremented by 1 to set it to 2, the document 2 print data is made in the temporary suspension state, and a current time is set to the time stamp. When ordinary print data transmitted from another client is received thereafter, this data is placed in the queue at the lowest. When the document 3 print data is received thereafter from the client "A", this data is placed between the document 2 print data and the ordinary print data of the other client, the document 3 print data is made in the temporary suspension state, the present number of documents is set to 3, and a current time is set to the time stamp. The document 4 print data is also processed in the same manner as above. When the document 5 print data is received, this data is placed immediately after the document 4 print data and the present number of documents is set to 5. Since the total number of documents becomes equal to the present number of documents, all the five document data sets registered in the queue are made in a print wait state, and the client information of the client "A" is deleted.

If it is judged at Step S51 that there is no data from a client, time-out of all sets of the client information is checked (Step S65). This time-out check process is almost the same as that of the first embodiment shown in FIG. 5, excepting that Step S33 of the first embodiment is deleted, the sub-queue data of the first embodiment is replaced by the client information, and the status "close" of the first embodiment is replaced by the print wait state of the data of the same client.

By using the queue-in process described above, the queue-out process same as the conventional system such as shown in FIG. 12 can be used.

First, data in the print wait state is searched from the upper side (Step S81), it is checked whether the data in the print wait state is present (Step S82), and if there is no data, the queue-out process is terminated, whereas if there is data in the print wait state, the data is sent to the printer 100 (Step S83) and the queue-out process is terminated.

Since sequential print data in the queue is in the temporary suspension state until all the sequential print data sets reach the spooler 114, print data from another client is sent to the printer with priority over the sequential print data. Since sequential print data is made in the print wait state after all the sequential data sets reach the spooler 114, these sequential print data sets are sent to the printer with priority.

<Fourth Embodiment>

Figure 14:
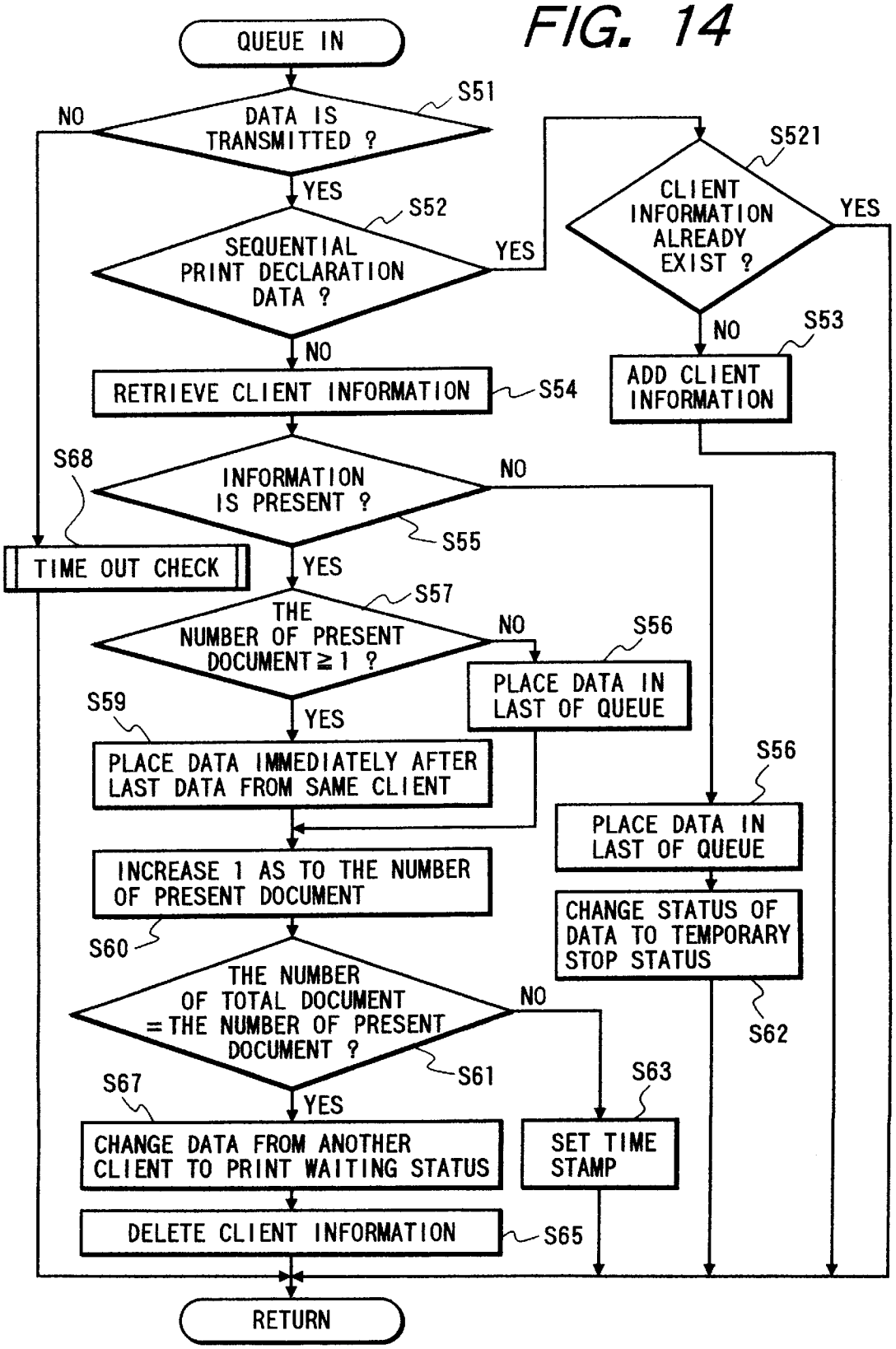
FIG. 14 is a flow chart illustrating a queue-in operation of the spooler to which a spooling method for sequentially printing a plurality of documents is applied, according to the fourth embodiment of the invention.

In the third embodiment, since sequential print data in the queue is in the temporary suspension state until all the sequential print data sets reach the spooler 114, print data from another client is sent to the printer with priority over the sequential print data. In the fourth embodiment, as shown in the flow chart of FIG. 14, the ordinary print data from another client is made in the temporary suspension state from when the first sequential print data reached to when the last sequential print data reaches, and when the last sequential print data reaches, the ordinary print data is changed in the print wait state (Step S67). In this manner, the sequential print data of the client can be printed with priority. In this case, however, since the sequential print data sets in the print wait state supplied from a plurality of clients are present in the queue, these data sets are sent to the printer 110 in a mixed state. To avoid this, the number of clients allowed to perform the sequential print is limited to one client (Step S521).

Figure 15:
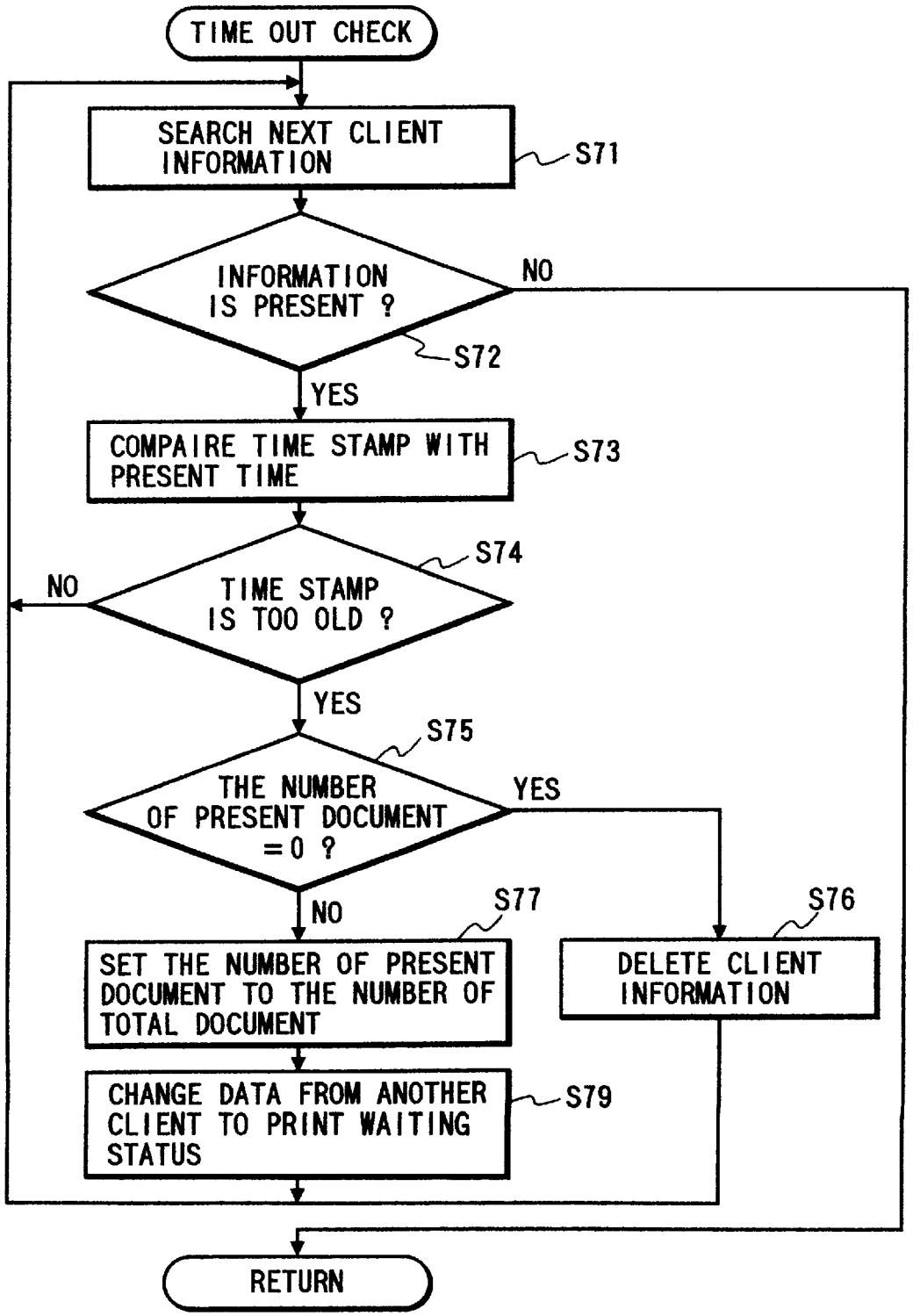
FIG. 15 is a flow chart illustrating a time-out check operation in the queue-in operation of the spooler to which a spooling method for sequentially printing a plurality of documents is applied, according to the fourth embodiment of the invention.

In this case, the time-out check process is almost the same as the third embodiment. However, as shown in FIG. 15, similar to Step S67 of the third embodiment, the data of another client is changed in the print wait state if the remaining sequential print data does not reach after a lapse of the predetermined time (Step S79).

In the first to fourth embodiments, print data received from a client is sent to the printer 100. Instead of a printer, a facsimile apparatus shared on a network may be used. In this case, sequential data sets from one client can be sequentially output to the facsimile apparatus.

According to the invention, a plurality of documents from one client can be reliably and sequentially printed. Since the printer 100 is not locked so as not to receive a print request from another client, the other client can use the printer 100 even during sequential print.

In the third and fourth embodiments, only the queue-in process of the spooler 114 is different from a conventional system, and the queue-out process same as the conventional system can be used.

The state of the spooler is notified to a client at a proper timing. The present print state is displayed via a driver on a display at the client, as shown in FIG. 17. Namely, the print order of each job is managed on RAM 113, and CPU 111 transmits this data representative of the print order to a requested client. The client displays the received print order data on the display, as shown in FIG. 17.

In the above description, a printer and a printer server are made discrete. The invention is not limited to such a case, but the printer and the printer server may be made integral.

The present invention may be applied to a system constituted by a plurality of apparatuses (e.g., a host computer, interface units, a reader, a printer, and the like) or to a system constituted by a single apparatus (e.g., a copier or a fax).

The scope of the invention also includes a system or apparatus whose CPU 111 reads and executes program codes of software realizing the embodiment functions and stored in RAM 113.

In this case, the software program codes themselves read from a storage medium realize the embodiment functions. Therefore, a storage medium storing such program codes, constitutes the present invention.

The storage medium storing such program codes may be a floppy disk, a hard disk, an optical disk, a magnetooptical disk, a CD-ROM, a CD-R, a magnetic tape, a non-volatile memory card, and a ROM.

Obviously, such program codes are other types of embodiments of this invention, not only for the case wherein the embodiment functions are realized by executing the program codes supplied to the computer but also for the case wherein the embodiment functions are realized by the program codes used with an OS (operating system) on which the computer runs or with other various types of application software.

Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the embodiment functions.

Figure 16:
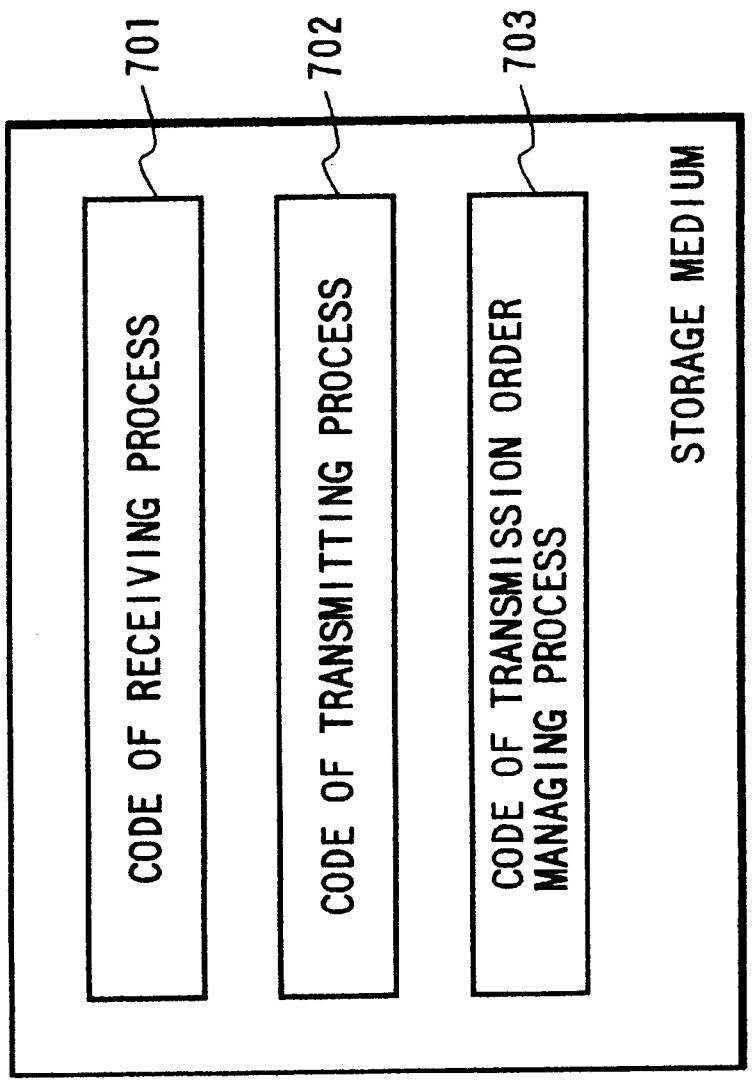
FIG. 16 is a diagram showing an example of a storage medium which stores program codes for controlling a printer server.

One example of such a storage medium is shown in FIG. 16. FIG. 16 shows an example of a storage medium for storing program codes used for controlling the printer server of the above embodiments.

Codes 701 of a receiving process correspond, for example, to Step S401. Codes 702 of a transmitting process correspond, for example, to Steps S503 and S505. Codes 703 of a transmission order managing process correspond to Steps S403 to S410 and Steps S501 to S508.

According to the invention, without obstructing other data supply sources, a plurality of image data sets from a particular data supply source can be sequentially processed.

The structure of the printer 100 shown in FIG. 1 will be described with FIGS. 18 and 19. The embodiment printer 100 is not limited to a laser printer and an ink jet printer, but obviously, other types of printers may also be used.

Figure 18:
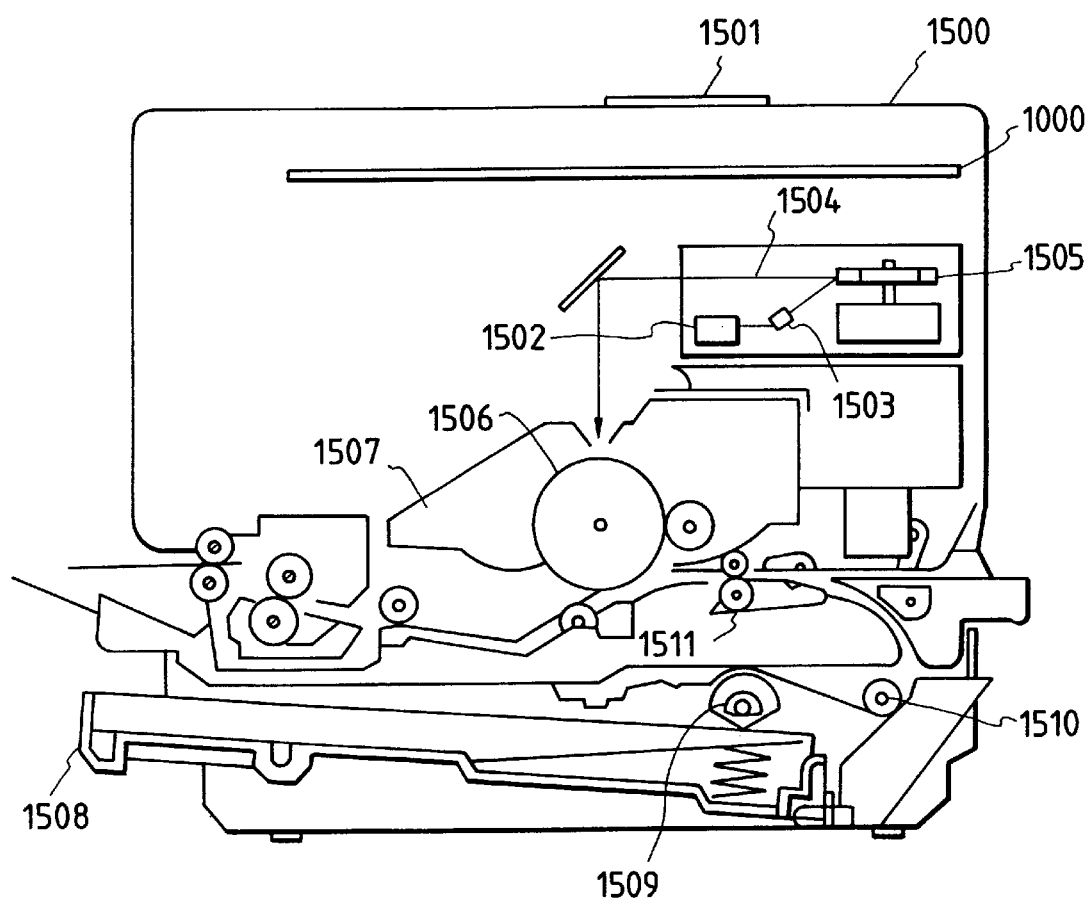
FIG. 18 is a diagram showing a laser beam printer as an example of a printer to which the invention is applied.

FIG. 18 is a cross sectional view showing the structure of a first output apparatus to which the invention is applicable, the first output apparatus being a laser printer (LBP).

In FIG. 18, reference numeral 1500 represents an LBP which receives and stores therein print information (character codes and the like), form information, or macro instructions, respectively supplied from an externally connected host computer, generates character patterns, form patterns, or the like in accordance with the supplied information, and forms an image on a recording medium such as a recording sheet. Reference numeral 1501 represents a console panel on which manual switches, LED displays, and the like are disposed. Reference numeral 1000 represents a printer control unit for controlling the whole of LBP 1500 and analyzing character information and the like supplied from the host computer. The printer control unit 1000 converts mainly character information into video signals of corresponding character patterns and outputs them to a laser driver 1502. The laser driver 1502 drives a semiconductor laser 1503 to turn on and off a laser beam 1504 radiated from the semiconductor laser 1503 in accordance with the input video signals. The laser beam 1504 is swung right and left by a rotary polygon mirror 1505 to scan and expose an electrostatic drum 1506 so that an electrostatic latent image of character patterns is formed on the electrostatic drum 1506. This latent image is developed by a developing unit 1507 disposed around the electrostatic drum 1506, and transferred to a recording sheet. Cut sheets are used as recording sheets and loaded in a paper cassette 1508 mounted on LBP 1500. Each cut sheet is transported into LBP 1500 and on the electrostatic drum 1506 by a paper feed roller 1509 and transport rollers 1510 and 1511. LBP 1500 has at least one card slot (not shown) to use an optional font card, a different language control card (emulation card), or the like, in addition to built-in fonts.

Figure 19:
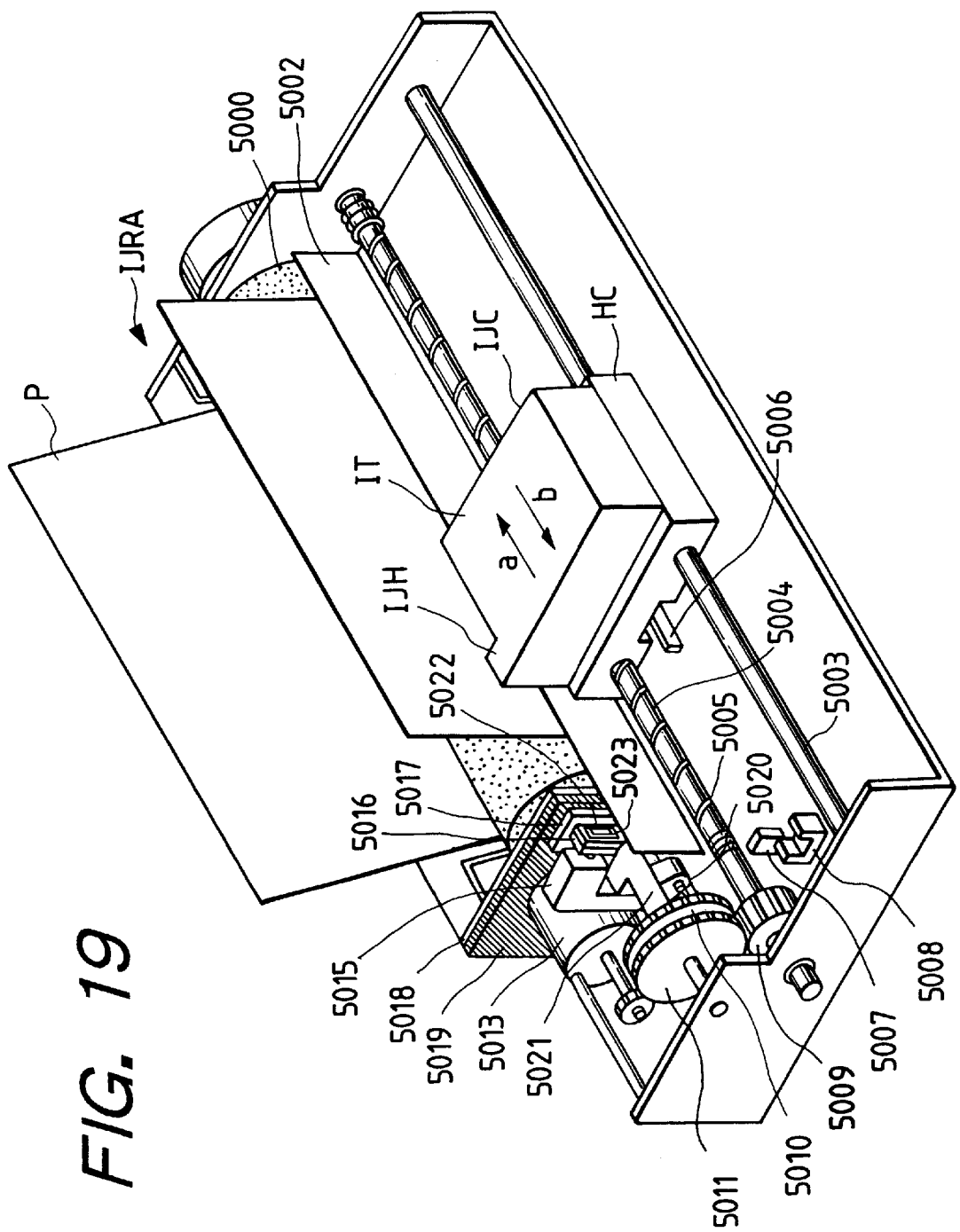
FIG. 19 is a diagram showing an ink jet printer as an example of a printer to which the invention is applied.

FIG. 19 is a perspective view showing the structure of a second output apparatus to which the invention is applicable, the first output apparatus being an ink jet recording apparatus (IJRA).

In FIG. 19, a lead screw 5005 is rotated by drive force transmission gears 5011 and 5009 which are moved in response to forward and reverse rotations of a driver motor 5013. The lead screw 5005 has a spiral groove 5004 which engages with a carriage HC with a pin (not shown). The carriage HC is reciprocally moved in arrows a and b directions, and an ink jet cartridge IJC is mounted on the carriage HC. A paper pusher 5002 pushes a sheet against a platen 5000 over the whole span of the carriage motion. Photo couplers 5007 and 5008 detect a presence of a lever 5006 of the carriage and serves as position detecting means for changing the rotation direction of the motor 5013. A member 5016 supports a cap 5022 which covers the whole surface of a recording head. Suction means 5015 evacuates the inside of the cap to effect suction recovery of the recording head via a cap inner opening 5023. A cleaning plate 5017 is made movable back and forth by a member 5019. A support plate 5018 supports the cleaning plate 5017 and the member 5019. A lever 5012 is used for starting suction of suction recovery, and is moved by a cam 5020 engaging with the carriage upon reception of a drive force from the driver motor via known transmission means such as a clutch.

The processes of capping, cleaning, and suction recovery are activated by the lead screw 5005 when the carriage reaches its home position. These processes may be activated at desired timings.

Figure 20:
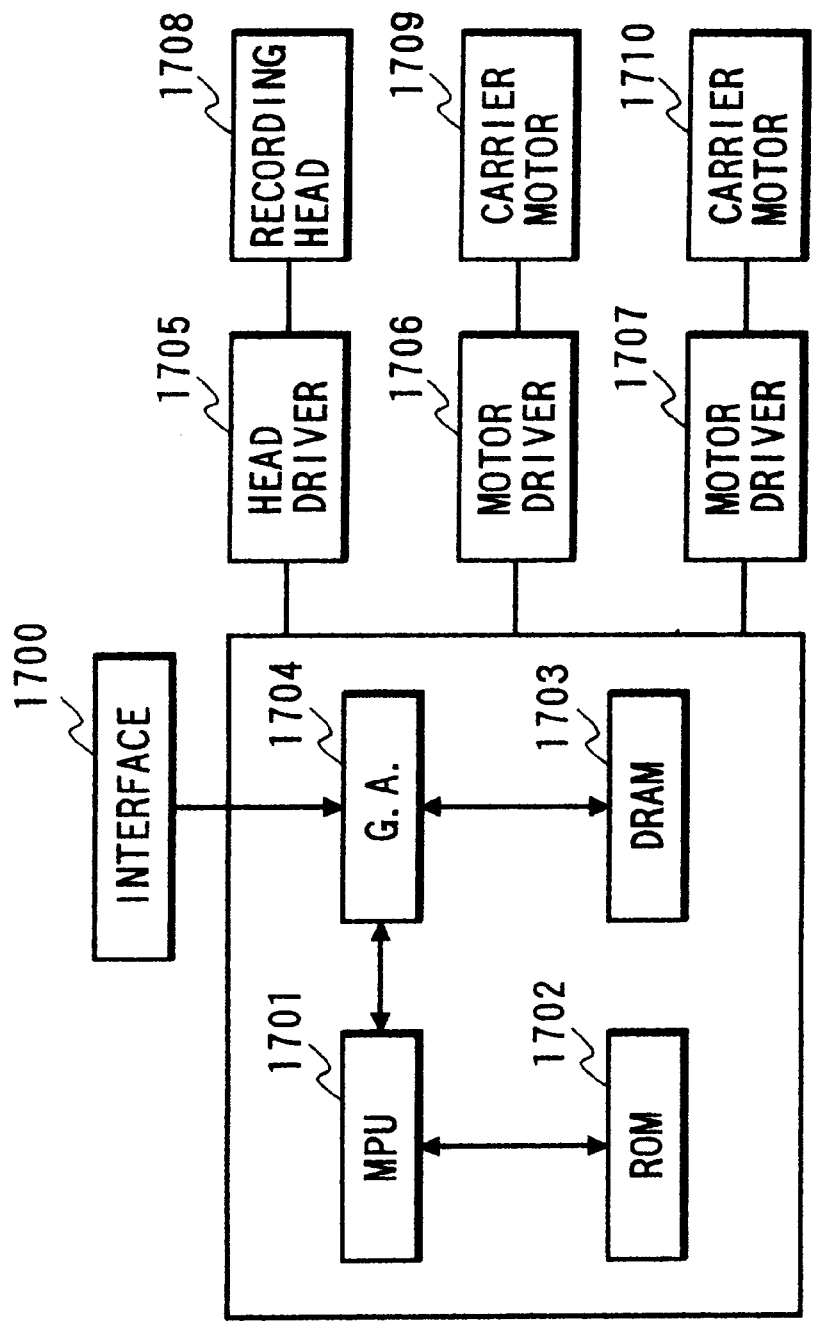
FIG. 20 is a block diagram illustrating the control of the ink jet printer shown in FIG. 19.

FIG. 20 is a block diagram illustrating the control of the second output apparatus shown in FIG. 19.

In FIG. 20, an interface unit 1700 is used for receiving a record signal from a host computer. A ROM 1702 stores control programs for an MPU 1701, host print information, and the like. A DRAM 1703 stores various data such as record signals and record data to be supplied to a head. A gate array 1704 supplies and controls data to be output to a recording head 1708, and also controls data transfer among the interface 1700, MPU 1701, and DRAM 1703. A carrier motor 1710 transports the recording head 1708. A transport motor 1709 transports a recording sheet. A head driver 1705 drives the recording head. A motor driver 1706 drives the transport motor 1709. A motor driver 1707 drives the carrier motor 1710.

In the recording apparatus with the control function described above, as data is input from a host computer to the interface 1700, the gate array 1704 and MPU 1701 convert the input data into print data. As the motor drivers 1706 and 1707 are operated, the recording head is driven to form a print image in accordance with the print data supplied to the head driver 1705.

What is claimed is:

1. An output control apparatus comprising:
   a receiver, arranged to receive a plurality of amounts of input data in a first sequential order from a plurality of data sources; and
   a controller, arranged to control data transmission to an output unit such that until said receiver receives a predetermined amount of input data from a predetermined one of the data sources, output data corresponding to the input data is transmitted in a second sequential order different from the first sequential order,
   wherein said controller controls the data transmission such that the output data corresponding to the input data which has been received from the predetermined one data source is not transmitted to the output unit if said receiver does not receive the predetermined amount of input data from the predetermined one data source.

2. An apparatus according to claim 1, wherein if said receiver receives the predetermined amount of input data from the predetermined one data source, said controller controls the data transmission such that the output data corresponding to the predetermined amount of input data is continuously transmitted to the output unit.

3. An apparatus according to claim 2, wherein said control means controls the data transmission such that the output data corresponding to the predetermined amount of input data is continuously transmitted to the output unit in response to receipt of a command instructing a continuous transmission operation.

4. An apparatus according to claim 3, wherein the command includes information indicative of the predetermined one data source.

5. An apparatus according to claim 3, wherein the command includes information indicative of the predetermined amount of input data.

6. An apparatus according to claim 1, further comprising a transmitter, arranged to transmit the output data to the output unit, wherein said controller assigns order data indicative of the second sequential order to the output data and said transmitter transmits the output data corresponding to the input data in the second sequential order based on the assigned order data.

7. An apparatus according to claim 1, wherein if said receiver does not receive a predetermined amount of input data from the predetermined one data source, said controller controls the data transmission such that the output data corresponding to the input data which has been received from the predetermined one data source is continuously transmitted to the output unit in response to receipt of a command instructing a continuous transmission operation.

8. An apparatus according to claim 1, further comprising:
a memory, arranged to store the input data received by said receiver; and
a memory controller, arranged to control said memory to store the predetermined amount of input data from the predetermined one data source in a memory area provided therefor.

9. An apparatus according to claim 1, further comprising an informer, arranged to inform a certain data source of the second sequential order for the output data corresponding to the input data received by said receiver from the data source.

10. An apparatus according to claim 2, further comprising the data source.

11. An apparatus according to claim 10, wherein said data source has a display, arranged to display the second sequential order for the output data corresponding to the input data received by said receiver from said data source.

12. An apparatus according to claim 1, further comprising the output unit.

13. An apparatus according to claim 12, wherein said output unit comprises a printer.

14. An apparatus according to claim 10, wherein said data source comprises a host computer.

15. An output control method comprising the steps of:
receiving, using a receiver, a plurality of amounts of input data in a first sequential order from a plurality of data sources; and
controlling data transmission to an output unit such that until the receiver receives a predetermined amount of input data from a predetermined one of the data sources, output data corresponding to the input data is transmitted in a second sequential order different from the first sequential order,
wherein said controlling step includes controlling the data transmission such that the output data corresponding to the input data which has been received from the predetermined one data source is not transmitted to the output unit if said receiver does not receive the predetermined amount of input data from the predetermined one data source.

16. A method according to claim 15, wherein if the receiver receives the predetermined amount of input data from the predetermined one data source, said controlling step includes controlling the data transmission such that the output data corresponding to the predetermined amount of input data is continuously transmitted to the output unit.

17. A method according to claim 16, wherein said controlling step includes controlling the data transmission such that the output data corresponding to the predetermined amount of input data is continuously transmitted to the output unit in response to receipt of a command instructing a continuous transmission operation.

18. A method according to claim 17, wherein the command includes information indicative of the predetermined one data source.

19. A method according to claim 17, wherein the command includes information indicative of the predetermined amount of input data.

20. A method according to claim 15, further comprising the step of transmitting the output data to the output unit, wherein said controlling step includes assigning order data indicative of the second sequential order to the output data and in said transmitting step the output data corresponding to the input data is transmitted in the second sequential order based on the assigned order data.

21. A method according to claim 15, wherein if the receiver does not receive a predetermined amount of input data from the predetermined one data source, said controlling step includes controlling the data transmission such that the output data corresponding to the input data which has been received from the predetermined one data source is continuously transmitted to the output unit in response to receipt of a command instructing a continuous transmission operation.

22. A method according to claim 15, further comprising the steps of:
storing, in a memory, the input data received in said receiving step; and
controlling the memory to store the predetermined amount of input data from the predetermined one data source in a memory area provided therefor.

23. A method according to claim 15, further comprising the step of informing a certain data source of the second sequential order for the output data corresponding to the input data received by said receiver from the data source.

24. A method according to claim 15, wherein the data source has a display, arranged to display the second sequential order for the output data corresponding to the input data received in said receiving step from the data source.

25. A method according to claim 15, wherein the output unit comprises a printer.

26. A method according to claim 15, wherein the data source comprises a host computer.

27. A memory medium storing executable code for executing an output control method that comprises the steps of:
receiving, using a receiver, a plurality of amounts of input data in a first sequential order from a plurality of data sources; and
controlling data transmission to an output unit such that until the receiver receives a predetermined amount of input data from a predetermined one of the data sources, output data corresponding to the input data is transmitted in a second sequential order different from the first sequential order,
wherein said controlling step includes controlling the data transmission such that the output data corresponding to the input data which has been received from the predetermined one data source is not transmitted to the output unit if said receiver does not receive the predetermined amount of input data from the predetermined one data source.

28. A memory medium according to claim 27, wherein if the receiver receives the predetermined amount of input data from the predetermined one data source, said controlling step includes controlling the data transmission such that the output data corresponding to the predetermined amount of input data is continuously transmitted to the output unit.

29. A memory medium according to claim 28, wherein said controlling step includes controlling the data transmission such that the output data corresponding to the predetermined amount of input data is continuously transmitted to the output unit in response to receipt of a command instructing a continuous transmission operation.

30. A memory medium according to claim 29, wherein the command includes information indicative of the predetermined one data source.

31. A memory medium according to claim 29, wherein the command includes information indicative of the predetermined amount of input data.

32. A memory medium according to claim 27, wherein the method further comprises the step of transmitting the output data to the output unit, and wherein said controlling step includes assigning order data indicative of the second sequential order to the output data and in said transmitting step the output data corresponding to the input data is transmitted in the second sequential order based on the assigned order data.

33. A memory medium according to claim 27, wherein if the receiver does not receive a predetermined amount of input data from the predetermined one data source, said controlling step includes controlling the data transmission such that the output data corresponding to the input data which has been received from the predetermined one data source is continuously transmitted to the output unit in response to receipt of a command instructing a continuous transmission operation.

34. A memory medium according to claim 27, wherein the method further comprises the steps of:

storing, in a memory, the input data received in said receiving step; and controlling the memory to store the predetermined amount of input data from the predetermined one data source in a memory area provided therefor.

35. A memory medium according to claim 27, further comprising the step of informing a certain data source of the second sequential order for the output data corresponding to the input data received by said receiver from the data source.

36. A memory medium according to claim 27, wherein the data source has display means for displaying the second sequential order for the output data corresponding to the input data received in said receiving step from the data source.

37. A memory medium according to claim 27, wherein the output unit comprises a printer.

38. A memory medium according to claim 27, wherein the data source comprises a host computer.

* * * * *

UNITED STATES PATENT AND TRADEMARK OFFICE
CERTIFICATE OF CORRECTION

PATENT NO. : 6,219,148 B1
DATED : April 17, 2001
INVENTOR(S) : Keiichi Takashima It is certified that error appears in the above-identified patent and that said Letters Patent is hereby corrected as shown below:

<u>Drawings,</u>
Sheet 5, Fig. 5, "COMPAIRE" should read -- COMPARE --.
Sheet 11, Fig. 11, "COMPAIRE" should read -- COMPARE --.
Sheet 15, Fig. 15, "COMPAIRE" should read -- COMPARE --.

Signed and Sealed this

Thirtieth Day of April, 2002

*Attest:*

*Attesting Officer*

JAMES E. ROGAN
*Director of the United States Patent and Trademark Office*